US012739156B2

(12) United States Patent
Ramanolla et al.

(10) Patent No.: US 12,739,156 B2
(45) Date of Patent: Sep. 15, 2026

(54) TRANSCEIVER CIRCUIT

(71) Applicant: NXP USA, Inc., Austin, TX (US)

(72) Inventors: Dileep Ramanolla, Hyderabad (IN); Uma Maheswara Reddy Poreddy, Hyderabad (IN); Shivesh Kumar Dubey, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 69 days.

(21) Appl. No.: 19/009,141

(22) Filed: Jan. 3, 2025

(65) Prior Publication Data

US 2025/0267049 A1 Aug. 21, 2025

(30) Foreign Application Priority Data

Feb. 20, 2024 (IN) ............................ 202441011936

(51) Int. Cl.
*H04L 25/49* (2006.01)
*H04L 1/00* (2006.01)

(52) U.S. Cl.
CPC ........ *H04L 25/4917* (2013.01); *H04L 1/0002* (2013.01)

(58) Field of Classification Search
CPC ............... H04L 25/4917; H04L 1/0002; H04L 2025/0349; H04L 25/03057; H04B 1/40; H04B 14/023; H04B 15/00
USPC .......................................................... 375/219
See application file for complete search history.

(56) References Cited

U.S. PATENT DOCUMENTS

| | | | |
|---|---|---|---|
| 5,734,598 A | 3/1998 | Abbott et al. | |
| 8,270,389 B2 | 9/2012 | Parnaby | |
| 8,941,420 B2 * | 1/2015 | Zerbe | H03L 7/24 327/119 |
| 9,628,262 B1 * | 4/2017 | Moe | H04L 7/06 |
| 11,139,800 B1 | 10/2021 | Weiss et al. | |
| 2013/0076433 A1 | 3/2013 | Fratti | |
| 2015/0256363 A1 | 9/2015 | Shvydun et al. | |

(Continued)

OTHER PUBLICATIONS

Den Besten, Gerrit "Line Modulation Considerations for 2.5Gbps and 10 Gbps Automotive Ethernet", NXP Semiconductors, Pittsburgh, May 2018 (19 pages).

(Continued)

*Primary Examiner* — Fitwi Y Hailegiorgis

(57) ABSTRACT

A transceiver circuit comprising: a transceiver clock input terminal to receive a transceiver clock signal defining a network frequency; a clock provision circuit to provide a coefficient clock signal, defining a coefficient frequency, and a coefficient adaption unit for providing a coefficient signal that represents one or more coefficient values. The coefficient adaption unit updates the one or more coefficient values at the coefficient frequency. The transceiver circuit also includes an adaptive filtering circuit that receives the coefficient signals at the network frequency, a filter input terminal to sequentially receive a stream of interference-symbols, and a filter output terminal to provide an interference-error signal to be removed from a network signal. The adaptive filtering circuit applies scaling factors to the coefficient signal to create scaled coefficient signals and uses the received interference-symbol to select one of the scaled coefficient signals to provide the interference-error signal.

15 Claims, 14 Drawing Sheets

(56) References Cited

U.S. PATENT DOCUMENTS

| | | | |
|---|---|---|---|
| 2021/0036900 | A1 | 2/2021 | Le et al. |
| 2021/0218604 | A1 | 7/2021 | Wu et al. |
| 2023/0362041 | A1 | 11/2023 | Nir |

OTHER PUBLICATIONS

Non-Final Office Action for U.S. Appl. No. 19/009,056 dated Mar. 17, 2026; 17 pages.

U.S. Appl. No. 19/009,056, filed Jan. 3, 2025; 34 pages.

* cited by examiner

Fig. 1
a)
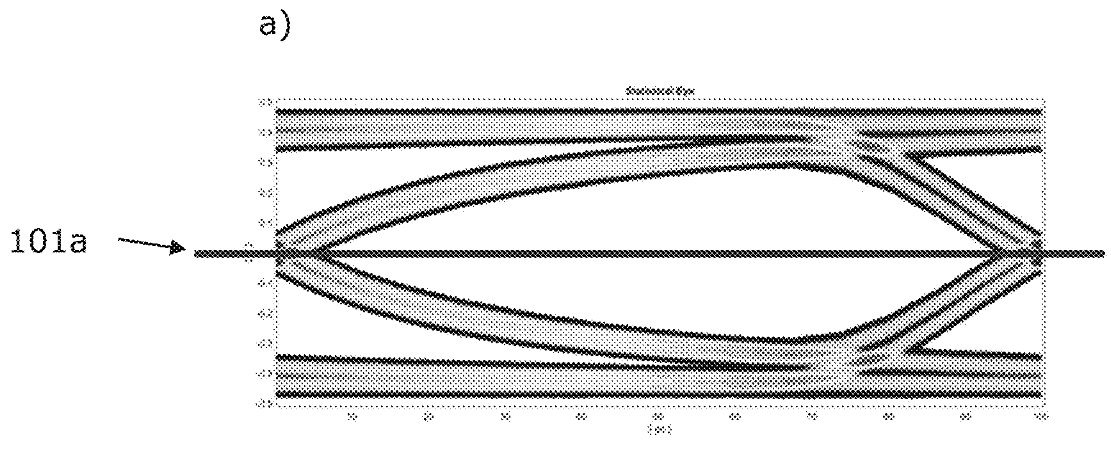
b)
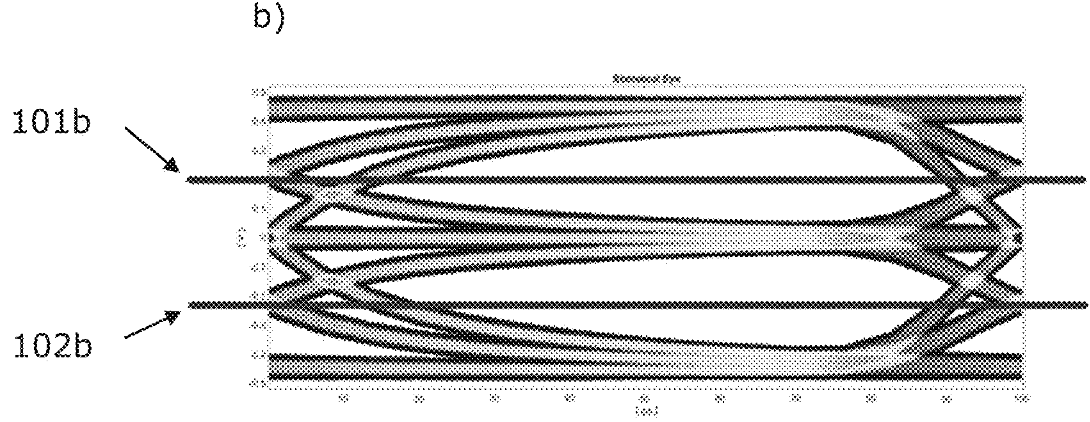
c)
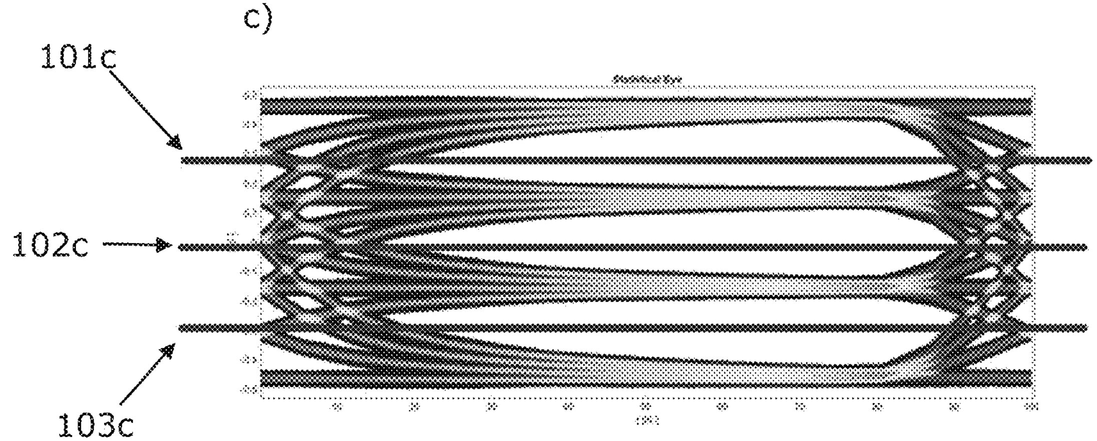

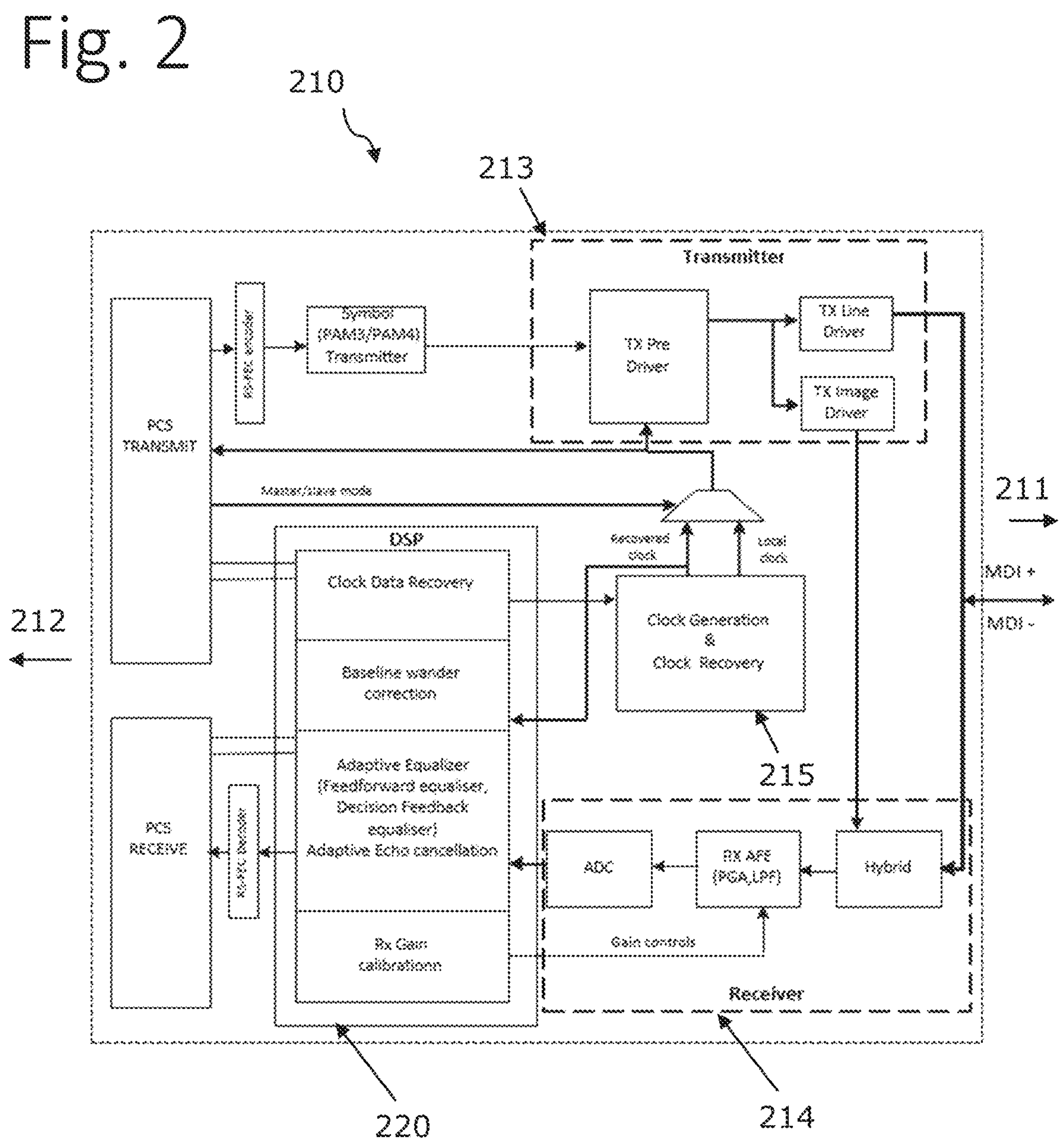
Fig. 2
210
213
Transmitter
Symbol (PAM3/PAM4) Transmitter
TX Pre Driver
TX Line Driver
TX Image Driver
PCS TRANSMIT
Master/slave mode
DSP
Recovered clock
Local clock
Clock Data Recovery
Clock Generation & Clock Recovery
211
MDI +
MDI -
212
Baseline wander correction
215
Adaptive Equalizer (Feedforward equaliser, Decision Feedback equaliser) Adaptive Echo cancellation
PCS RECEIVE
ADC
RX AFE (PGA,LPF)
Hybrid
Rx Gain calibrationn
Gain controls
Receiver
220
214

Fig. 5
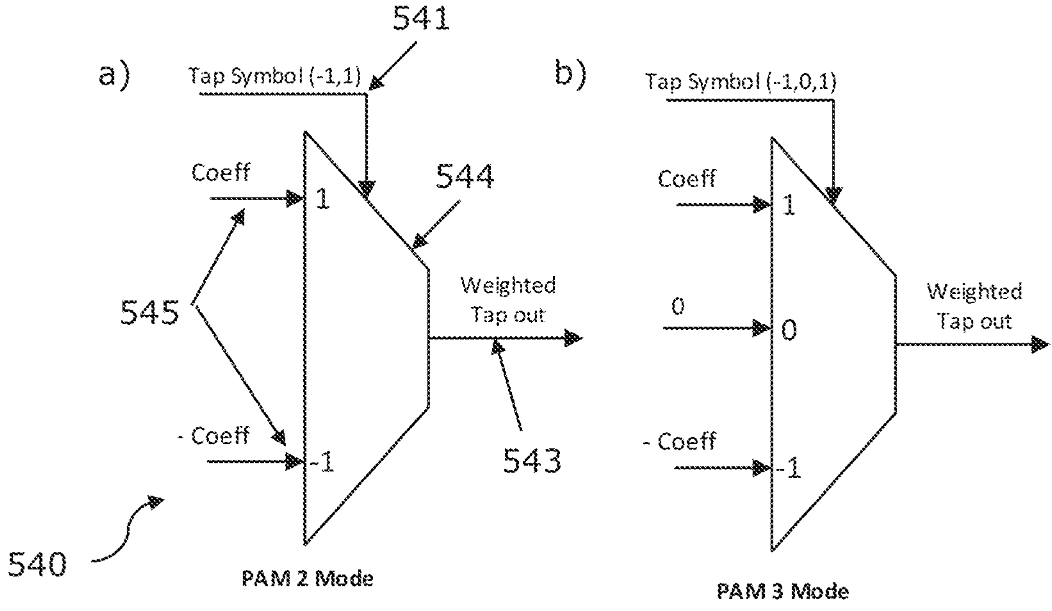
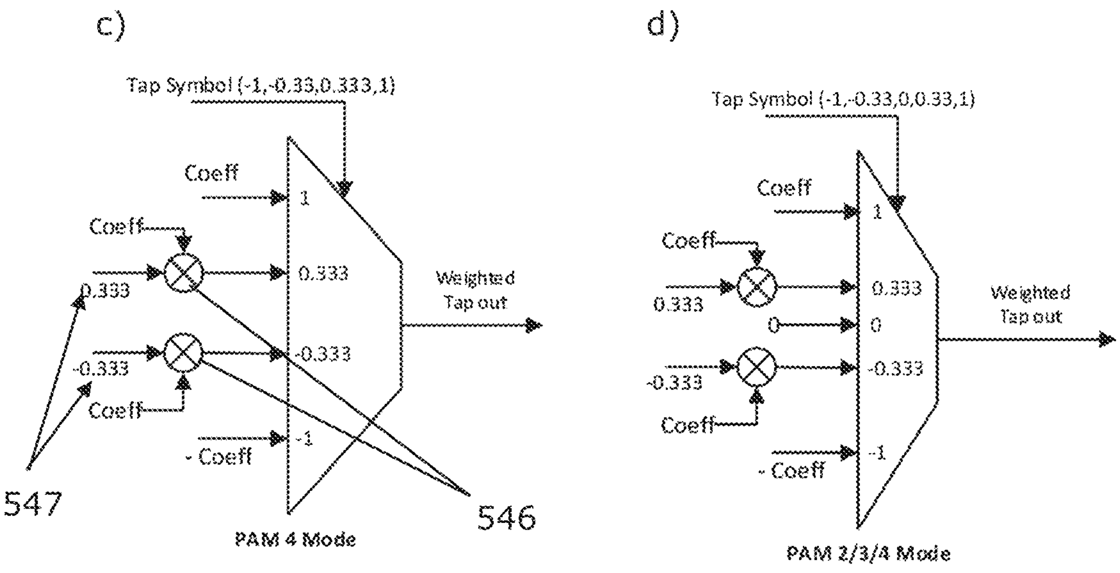

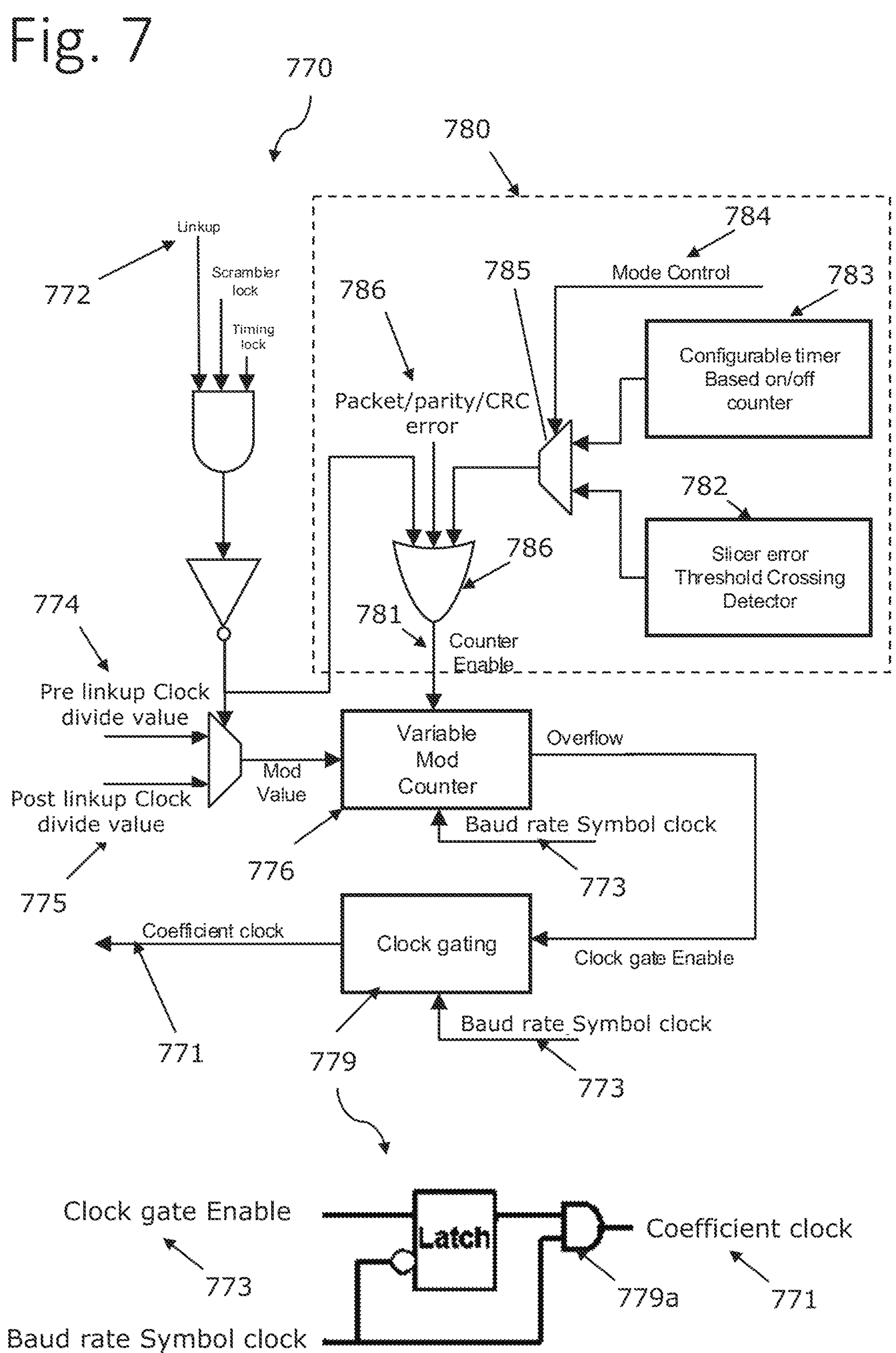

Fig. 7
770
780
784
785
786
783
772
Linkup
Scrambler lock
Timing lock
Mode Control
Configurable timer Based on/off counter
Packet/parity/CRC error
782
Slicer error Threshold Crossing Detector
786
781
Counter Enable
774
Pre linkup Clock divide value
Variable Mod Counter
Overflow
Mod Value
Post linkup Clock divide value
Baud rate Symbol clock
776
773
775
Coefficient clock
Clock gating
Clock gate Enable
Baud rate Symbol clock
771
779
773
Clock gate Enable
Latch
Coefficient clock
773
779a
771
Baud rate Symbol clock 840
Tap Symbol (-1,-0.33,0,0.33,1)
Weighted
Tap out
1
0.333
0
-0.333
-1
Coeff
0
- Coeff
Coeff
0.333
-0.333
Coeff
846
PAM 2/3/4 Mode
tap_symbol
873
848
D
Pre-sampling_tap_symbol
Transceiver_clock
841
Coeff
871
849
D
Pre-sampling_coeff
Coefficient_clock
842

960
968
Prev_tap_symbol
Pre-sampling_prev_tap_symbol
D
Coefficient_clock
961
973
962
969
Pre-sampling_slicer_error
slicer_error
Coefficient_clock
971
{Prev Tap Symbol (-3,-1,0,1,3)}
Slicer_error
slicer_error
0.333
966
0
-0.333
slicer_error
slicer_error
3
1
-1
-3
Mu Factor
992
Coeff
991
Coefficient_clock
971
PAM 2/3/4 Data Mode Receiving a transceiver clock signal
1401
Providing either a first clock signal or a second clock signal as a coefficient clock signal
1402
Providing a coefficient signal that represents one or more coefficient values
1403
Providing an interference error signal for removing from a network signal
1404

TRANSCEIVER CIRCUIT

CROSS-REFERENCE TO RELATED APPLICATIONS

This application claims priority under 35 U.S.C. § 119 to Indian Patent Application number 202441011936, filed Feb. 20, 2024, the contents of which are incorporated by reference herein.

CROSS-REFERENCE TO RELATED APPLICATIONS

This application claims priority under 35 U.S.C. § 119 to Indian patent application no. 202441011936, filed Feb. 20, 2024, the contents of which are incorporated by reference herein.

FIELD

The present disclosure relates to a transceiver circuit for transmitting and receiving pulse amplitude modulation, PAM, network signals.

SUMMARY

According to a first aspect of the present disclosure there is provided a transceiver circuit for transmitting and receiving signals within a network, wherein the transceiver circuit comprises:

- a transceiver clock input terminal configured to receive a transceiver clock signal that defines a network frequency;
- a clock provision circuit configured to provide either: i) a first clock signal or ii) a second clock signal as a coefficient clock signal, based on a received rate-selection-signal, wherein
  - the first clock signal defines a first frequency, and
  - the second clock signal defines a second frequency that is lower than the first frequency;
- a coefficient adaption unit for providing a coefficient signal that represents one or more coefficient values, wherein
  - the coefficient adaption unit is configured to update the one or more coefficient values at the coefficient frequency;
- an adaptive filtering circuit, comprising:
  - at least one coefficient input terminal connected to the coefficient adaption unit for receiving the coefficient signals,
  - a filter input terminal for sequentially receiving a stream of interference-symbols at the network frequency, and
  - a filter output terminal for providing an interference-error signal, wherein the interference-error signal is for removing from a network signal,
  - wherein the adaptive filtering circuit is configured to:
    - apply a plurality of scaling factors to the coefficient signal to create a plurality of scaled coefficient signals, and
    - use the received interference-symbol to select one of the scaled coefficient signals to use to provide the interference-error signal.

In one or more embodiments the signals within the network are pulse amplitude modulation, PAM, signals.

In one or more embodiments the PAM signals can take a value according to any of two-level modulation, three-level modulation or four-level modulation.

In one or more embodiments the clock provision circuit is configured to either:

- scale the transceiver clock signal by applying a first scaling factor to the transceiver clock signal to provide the first clock signal as the coefficient signal, or
- scale the transceiver clock signal by applying a second scaling factor to the transceiver clock signal to provide the second clock signal as the coefficient signal.
- the first frequency may be equal to or less than the network frequency.

In one or more embodiments the adaptive filtering circuit comprises a plurality of weighting blocks configured to:

- receive a different interference-symbol to the interference-symbol received by each other weighting block from the stream as a tap-symbol at the network frequency,
- apply a plurality of scaling factors to the coefficient signal, and
- use the received tap-symbol to select one of the scaled coefficient signals to use to provide the interference-error signal.

The adaptive filtering circuit may be configured to combine the selected scaled coefficient signals provided by each weighting block of the plurality of weighting blocks to provide the interference-error signal.

In one or more embodiments, the transceiver circuit further comprises:

- a slicer connected to the receiver output terminal and configured to compare the processed-network-signal to a plurality of slicer thresholds and provide a received symbol such that the received symbol has one of a plurality of target values associated with the PAM modulation level of the network signals.

In one or more embodiments the clock provision circuit further comprises an enable signal circuit configured to provide an enable signal that can have an enabled value or a disabled value. The clock provision circuit may be configured to:

- provide the coefficient clock signal when the enable signal has the enabled value; and
- not provide the coefficient clock signal when the enable signal has the disabled value.

In one or more embodiments the enable signal circuit is configured to provide the enable signal based on the magnitude of the difference between the received signal and the processed-network-signal.

In one or more embodiments the enable signal circuit is configured to provide the enable signal based on a timing signal from a timer with configurable on/off times.

In one or more embodiments the enable signal circuit is configured to provide the enable signal based on either the magnitude of the difference between the received signal and the processed-network-signal or a timing signal from a timer with configurable on/off times based on an operational-control-signal.

In one or more embodiments the enable signal circuit is configured to provide the enable signal based on a detected error signal representative of the level of detected errors within the network.

In one or more embodiments the enable signal circuit is configured to provide the enable signal based on the rate-selection signal.

In one or more embodiments the enable signal circuit is configured to provide the enable signal by any of:

a detected error signal representative of the level of detected errors within the network, the rate-selection signal, or either the magnitude of the difference between the received signal and the processed-network-signal or a timing signal from a timer with configurable on/off times based on the operational-control-signal.

In one or more embodiments, the transceiver circuit further comprises a slicer error signal block configured to provide a slicer error signal. The slicer error signal may be the difference between the processed-network-signal and the received symbol. The coefficient adaption unit may comprise:

at least one slicer error input terminal for receiving the slicer error signal, at least one interference symbol input terminal for receiving the stream of interference symbols, a delay block for applying a delay to the stream of interference-symbols to provide a stream of previous interference symbols, such that the previous interference symbols are aligned with the slicer error signal that they represent, or are derived from, and a coefficient-output terminal for providing the coefficient signal.

The coefficient adaption unit may be configured iteratively update the coefficient signal based on the slicer error signal and the aligned stream of previous interference symbols at the coefficient frequency.

In one or more embodiments the network is ethernet.

According to a second aspect of the present disclosure there is provided a method for transmitting and receiving signals within a network, wherein the method comprises:

receiving a transceiver clock signal that defines a network frequency;

providing either: i) a first clock signal or ii) a second clock signal as a coefficient clock signal, based on a received rate-selection-signal, wherein the first clock signal defines a first frequency, and the second clock signal defines a second frequency that is lower than the first frequency;

providing a coefficient signal that represents one or more coefficient values, wherein providing the coefficient signal comprises:

updating the one or more coefficient values at the coefficient frequency; and providing an interference-error signal for removing from a network signal, wherein providing the interference-error signal comprises:

applying a plurality of scaling factors to the coefficient signal to create a plurality of scaled coefficient signals, and using the received interference-symbol to select one of the scaled coefficient signals to use to provide the interference-error signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 1 shows an example of different PAM modulation levels;

FIG. 2 shows a transceiver according to an embodiment of this disclosure that can be used within an ethernet network;

FIG. 5 shows example implementations of a tap weighting block using the example thresholds described previously in reference to FIG. 1;

FIG. 7 shows a clock provision circuit according to an embodiment of this disclosure;

DETAILED DESCRIPTION

Figure 3:
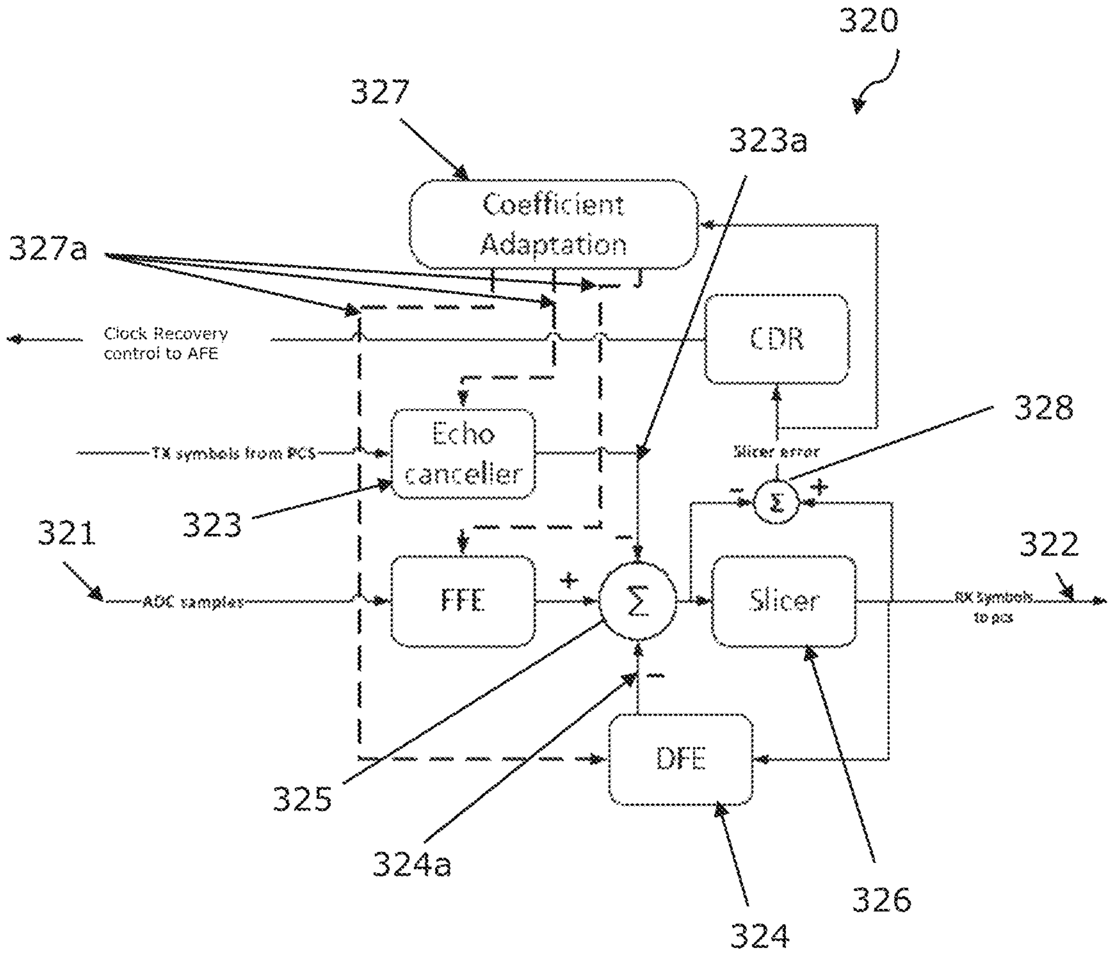
FIG. 3 shows an example adaptive digital equaliser (ADE), which represents an example implementation of at least part of the DSP of FIG. 2.

Pulse amplitude modulation (PAM) is a method of encoding data within a signal wherein the amplitude of a pulse is varied, within a known time frame, to represent a data symbol. To provide a simple example, a pulse with a low amplitude could represent a zero and a pulse with a high amplitude could represent a one. The time frame allocated to each data symbol is constant so that a receiver can understand which pulse represents which symbol in a message.

PAM symbols may represent a wider variety of data than simply zero and one. By implementing different numbers of thresholds, a device can distinguish between different numbers of data symbols that could be represented by a pulse.

FIG. 1 shows an example of different PAM modulation levels. FIG. 1*a*) shows two-level PAM modulation (PAM-2), FIG. 1*b*) shows three-level PAM modulation (PAM-3) and FIG. 1*c*) shows four-level PAM modulation (PAM-4).

A data symbol according to PAM-2 can represent two different values, such that one threshold 101*a* is required to distinguish between the two different values (a first value when the level is above the threshold 101*a*, and a second value when the level is below the threshold 101*a*). A target value can be associated with each of the different values, which represents an expected level of a corresponding signal on the network. For example, PAM-2 can define target values of −Q and Q, wherein Q is any digital value. These target values can be distinguished from each other using a threshold of 0.

A data symbol according to PAM-3 can represent three different target values, such that two different thresholds 101*b*, 102*b* are required to distinguish between the three different values. These thresholds are a high-threshold and a low-threshold. The symbol can have: a first value when the level is above the high-threshold 101*b*, a second value when the level is between the high-threshold 101*b* and the low-threshold 102*b*, and a third value when the level is below the low-threshold 102*b*. For example, PAM-4 can define target values of −Q, 0 and Q. These target values can be distinguished using thresholds at −0.5Q and 0.5Q.

A data symbol according to PAM-4 can represent four different target values, such that three different thresholds 101*c*, 102*c*, 103*c* are required to distinguish between the three different values. These thresholds are a high-threshold, a medium-threshold and a low-threshold. The symbol can have: a first value when the level is above the high-threshold 101*c*; a second value when the level is between the high-threshold 101*c* and the middle-threshold 102*c*; a third value when the level is between the middle-threshold 102*c* and the low-threshold 103*c*; and a fourth value when the level is below the low-threshold 102*c*. For example, PAM-4 can define target values of −Q, −Q/3, Q/3 and Q. These target values can be distinguished using thresholds at −2Q/3, 0 and 2Q/3. It will be appreciated that this pattern can continue for all PAM modulation levels higher than four.

By using the example target values described here, where Q is normalised with respect to each of PAM-2/3/4, it is possible to use the same hardware to distinguish between target values within any of PAM-2/3/4 depending on the network requirements. In this way, the same hardware can be implemented in a variety of network applications and some flexibility is afforded to the network to be able to communicate using whichever of the PAM modulation levels is appropriate.

FIG. 2 shows a transceiver 210 according to an embodiment of this disclosure that can be used within an ethernet network. The transceiver 210 can be used for a half duplex or a full duplex ethernet physical (PHY) layer. The transceiver 210 is connected to a network bus 211 (as shown by MDI+ and MDI− in FIG. 2) (MDI—media dependent interface) and is connected to a node controller 212. The node controller 212 is configured to: perform operations based on signals received from other nodes in the network over the network bus 211; and also produce symbols for sending to other nodes within the network over the network bus 211.

The transceiver 210 includes a transmitter 213 and a receiver 214, as shown in FIG. 2. To transmit signals onto the network bus 211, the node controller 212 first provides a transmission symbol to the transmitter 213 within the transceiver 210. The transmitter 213 then provides the transmission symbol to the network bus 211. The transmitter 213 may also be configured to perform other operations on the transmission symbol to prepare the transmission symbol for sending over the network such as shifting the level and aligning the transmission symbol with a clock, as is known in the art.

To receive signals from the network bus 211, the receiver 214 within the transceiver 210 receives signals from the network bus 211 and provides the received signals to a digital signal processing unit (DSP) 220. The DSP 220 processes the received signal to provide a received symbol, which represents symbols that have been identified in the received signals, to the node controller. The DSP 220 also includes other operations such as clock data recovery, automatic gain control and echo cancellation. The receiver 214 may also be configured to perform other operations on the received signal to prepare the transmission symbol for further processing by the DSP 220 such as gain amplification and low-pass filtering, as is known in the art.

The transceiver also includes clock generation circuitry 215 to provide one or more clock signals used to synchronise various of the components 213,214,220 within the transceiver 210. The transceiver components 213,214,220 may also be synchronised with other nodes within the network. The one or more clock signals provided by the clock generation circuitry 215 may be divided or otherwise manipulated to improve the power efficiency of the transceiver. The DSP 220 may include clock manipulation circuitry to divide or manipulate the one or more clock signals provided by the clock generation circuitry 215, such as the clock provision circuitry discussed later in reference to FIG. 7.

FIG. 3 shows an example adaptive digital equaliser (ADE) 320, which represents an example implementation of at least part of the DSP of FIG. 2. The ADE 320 can be used to process PAM network signals that are associated with a plurality of different PAM modulation levels, as described above in reference to FIG. 1. For example, the ADE can process PAM network signals which can take a value according to a PAM modulation level of any one of PAM-2, PAM-3 and PAM-4.

The ADE 320 includes a receiver input terminal 321 and a receiver output terminal 322. The receiver input terminal receives network signals from a receiver (such as the one shown in FIG. 2, but not shown in FIG. 3). The receiver output terminal 322 provides symbols to the node controller (not shown).

The ADE 320 in this example includes two adaptive filtering circuits: an echo canceller 323 and a decision feedback equaliser (DFE) 324. In other examples, only a single adaptive filtering circuit may be used. The adaptive filtering circuits determine and provide an interference error signal 323*a*,324*a*, which is representative of interference within the received network signal. To do this, the adaptive filtering circuits apply a plurality of scaling factors to a coefficient signal to create a plurality of scaled coefficient signals, and they use a received interference symbol to select one of the scaled coefficient signals to provide the interference error signal. As will be discussed in more detail below, the echo canceller 323 provides an interference error signal 323*a* that can correlate with the transmitted signals and can be cancelled using adaptive finite impulse response for a better estimation of far end transmission symbols. The DFE 324 provides an interference error signal 324*a* that represents inter-symbol interference (ISI) on the network bus. The adaptive digital equaliser 320 also includes an interference cancellation block 325 that subtracts the interference error signals 323*a*,324*a* from the network signal to provide a processed network signal.

The adaptive digital equaliser 320 in this example also includes a slicer 326, which is connected between the interference cancellation block 325 and the receiver output terminal 322. The slicer 326 compares the processed network signal to a one or more slicer thresholds (depending upon which PAM modulation levels are being used) to provide a received symbol to the receiver output terminal 322. In this way, the received symbol has one of a plurality of target values associated with the PAM modulation level of the network signals.

In this example, the echo canceller 323 receives transmission symbols (TX symbols) from the node controller (not shown) and uses the transmission symbols to determine an echo interference error signal 323*a*, which can be subtracted from the received network signals in order to reduce the undesirable effects of echo signals that are present on the network bus. The DFE 324 receives received symbols from the output of the slicer 326 and uses the received symbols to determine an ISI interference error signal 324*a*, which can be subtracted from the received network signals in order to reduce the undesirable effects of inter-symbol interference on the network bus.

The adaptive digital equaliser 320 also includes a coefficient adaption unit 327. The coefficient adaption unit 327 provides a coefficient signal that represents one or more coefficient values 327*a* to the echo canceller 323 and the DFE 324. As will be discussed below, the coefficient signal 327*a* is used by the echo canceller 323 and the DFE 324 to determine their respective interference error signals.

In this example, the adaptive digital equaliser 320 also includes a slicer error block 328 connected to a slicer input terminal and a slicer output terminal. The slicer error block 328 is configured to provide a slicer error signal. The slicer error signal is the difference between the processed network signal and the received symbol (i.e., the difference between the input signal to, and the output signal of, the slicer error block 328). The slicer error signal block 328 provides the slicer error signal to the coefficient adaption block 327. In this example, the coefficient adaption block 327 uses the slicer error signal to produce the coefficient signal 327*a*. As will be discussed below with reference to FIG. 6, the coefficient adaption block 327 can iteratively update the coefficient signal 327*a* based on the slicer error signal.

The adaptive digital equaliser may also include additional components for the purpose of processing signals such as a high pass filter and a feed-forward equaliser.

Figure 4:
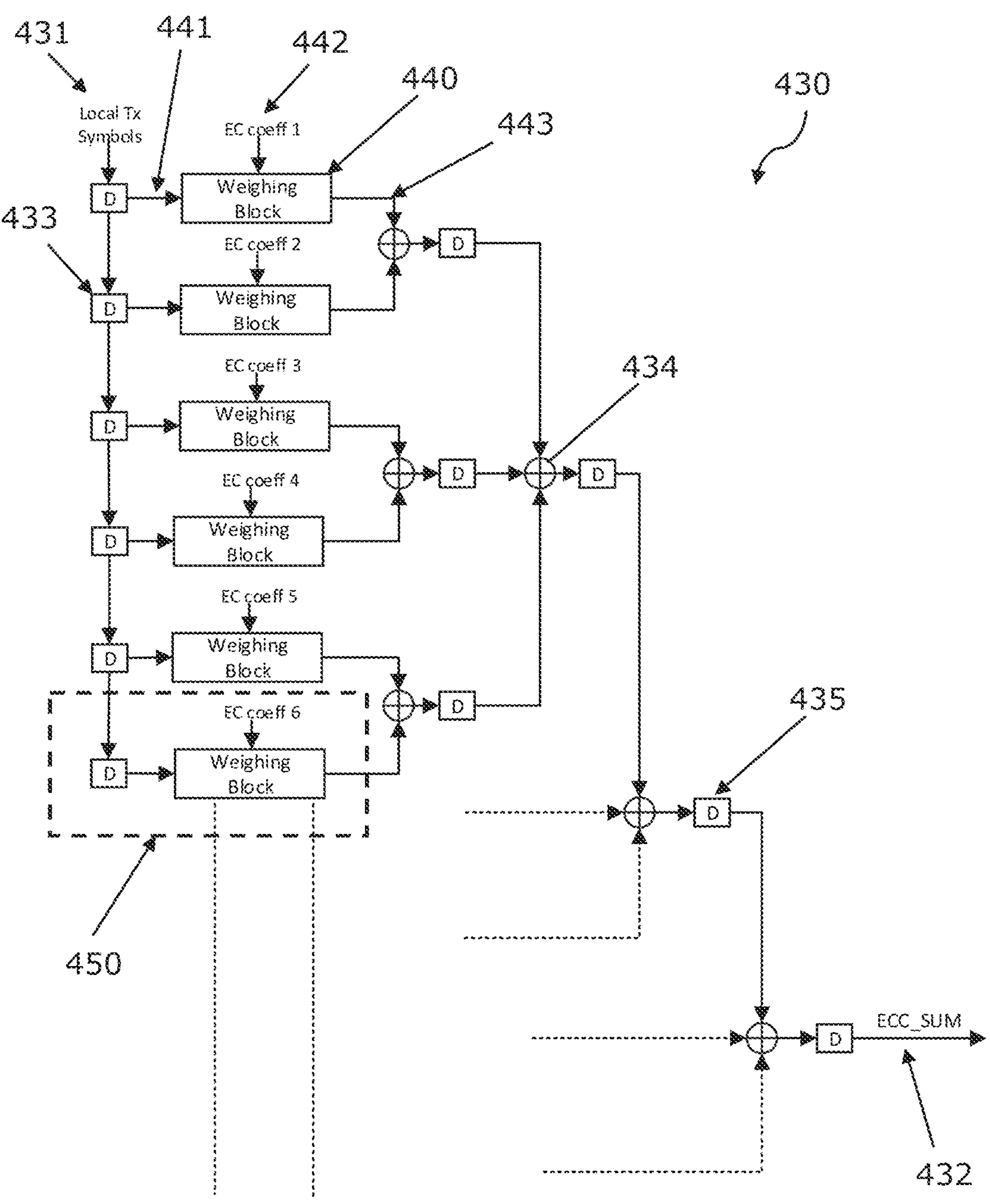
FIG. 4 shows a structure for an adaptive filtering circuit which may be used within the echo canceller or DFE described in relation to FIG. 3.

FIG. 4 shows a structure for an adaptive filtering circuit 330 which may be used within the echo canceller or DFE described in relation to FIG. 3. In this example, the adaptive filtering circuit 330 is a finite impulse response adaptive filtering circuit. The adaptive filtering circuit 430 has a filter input terminal 431, a filter output terminal 432 and a plurality of taps 450. The number of taps 450 required depends upon the type of channel used. In order to provide a useable output, there is a need for a significant number of taps, for example 100-500. The filter input terminal 431 receives a stream of interference symbols and the filter output terminal 432 provides the interference error signal, the specific details of these signals depend on the type of adaptive filtering circuit being used (see the discussion of FIG. 3).

The adaptive filtering circuit 430 also includes a plurality of tap weighting blocks 440 which are repeated per tap of the adaptive filtering circuit. Each tap weighting block 440 has a tap input terminal 441, a coefficient input terminal 442 and a tap output terminal 443. In this example, the adaptive filtering circuit includes a delay block 433 connected to the receiver input terminal and the tap input terminal 441 of each tap weighting block 440. The delay blocks 433 are connected in series and in this way, the tap weighting blocks 440 are connected in parallel to one another.

The tap input terminal 441 of each tap weighting block 440 sequentially receives the stream of interference symbols from the filter input terminal 431, such that each tap weighting block receives a different interference symbol to the interference symbol received by each other tap weighting block 440 from the stream as a tap symbol. That is, the delay blocks 433 provide an interference symbol to each tap weighting block 440 at the same instant in time such that the first tap weighting block 440 receives the current interference symbol, the second tap weighting block 440 receives the previous interference symbol, the third tap weighting block 440 receives the interference symbol before the previous interference symbol, and so on.

The coefficient input terminal 442 of each tap weighting block receives a coefficient signal. The coefficient signal may be different for each tap weighting block 440 or the same for each tap weighting block 440. Each tap weighting block 440 uses the tap symbol and the coefficient signal to provide a tap output signal to the tap output terminal 443. How the tap weighting block uses the tap symbol and the coefficient signal to provide a tap output signal will be described later, in relation to FIG. 6.

The adaptive filtering circuit 430 also includes one or more summation blocks 434 to combine the tap output signals of each tap weighting block 440 in order to provide the interference error signal to the filter output terminal 432. The number of summation blocks 434 depends on the number of tap weighting blocks 430 in the adaptive filtering circuit. In this example, an additional delay block 435 is connected to the output terminals of each summation block 434. FIG. 4 shows an architecture in which summation blocks 434 and additional delay blocks 435 are repeated until all of the tap output signals are combined at the filter output terminal 432 of the adaptive filtering circuit 430.

It is advantageous for signals having multiple different PAM modulation levels to be processable by a single adaptive filtering circuit common hardware. For example, the ethernet protocol supports a number of different PAM modulation levels which are used depending on the specific requirements of different applications. In automotive ethernet for 1000base-T1, a node within a network performs link training in a PAM-2 mode, and then post link training the link switches from PAM-2 to PAM-3 in 1000base-T1 mode. For post link training in 2500base-T1, the link switches from PAM-2 to PAM-4. Therefore, it can be beneficial for a transceiver to possess the capability to operate within a plurality of PAM modulation levels using the same hardware, even if the transceiver is intended for use within only one type of network. However, such operation, using a plurality of PAM modulation levels, can be difficult to efficiently achieve.

FIG. 5 shows example implementations of a tap weighting block 540 using the example thresholds described previously in reference to FIG. 1. FIG. 5*a*) shows a tap weighting block 540 suitable for use within PAM-2. FIG. 5*b*) shows a tap weighting block suitable for use within PAM-3. FIG. 5*c*) shows a tap weighting block suitable for use within PAM-4. FIG. 5*d*) shows a tap weighting block suitable for use within PAM-2, PAM-3 and PAM-4.

Each tap weighting block 540 follows a similar format. They each include a multiplexer 544 with a plurality of multiplexer input terminals 545, a select terminal 541 and a multiplexer output terminal 543.

Each multiplexer input terminal 545 receives a scaled coefficient signal which is a version of the coefficient signal (received from the coefficient input terminal of the tap weighting block) which has been scaled by a different scaling factor. The scaling factors correspond to the target values for an appropriate PAM modulation level. For a PAM-2 tap weighting block using the example target values and thresholds previously described, the scaling factors are −1 and 1. For a PAM-3 tap weighting block, the scaling factors are −1, 0 and 1. For a PAM-4 tap weighting block the scaling factors are −1, −⅓, ⅓ and 1. For a PAM-2/3/4 tap weighting block the scaling factors are −1, −⅓, 0, ⅓ and 1. In this way, the PAM-2/3/4 tap weighting block is able to utilise any scaling factor which is required by any of PAM-2, PAM-3 or PAM-4.

The select terminal 541 is connected to the tap input terminal of the tap weighting block 540 and uses the value of a tap symbol received by said tap input terminal to set which of the scaled coefficient signals is provided as a tap output signal at the multiplexer output terminal 543. The multiplexer output terminal 543 is connected to the tap output terminal of the tap weighting block.

In this way, the adaptive filtering circuit can build an interference error signal from coefficient signals which have been appropriately scaled based on the interference signals which are being received.

A tap weighting block for use within PAM-4 (FIGS. 5*c*) and 5*d*)) may use scaling circuitry such as: multiplier circuits 546 that multiply the received coefficient signal (Coeff) by ⅓ 547 in order to produce the scaled coefficient signal multiplexer input signals that are used for PAM-4. The tap weighting block may instead use any other types of scaling circuitry to produce the scaled coefficient signal multiplexer input signals, such as adder circuits.

The tap weighting block 540 may include a coefficient sampling block (not shown) between the multiplexer input terminals 545 and the coefficient input terminal to provide coefficient signals to the scaling circuitry. The coefficient sampling block may provide the coefficient signals to the scaling circuitry by sampling signals from the coefficient input terminal.

Similarly, the tap weighting block 540 may also include a tap sampling block (not shown) between the select terminal 541 and the tap input terminal to provide tap symbols to the select terminal 541. The tap sampling block may provide the tap symbols to the select terminal by sampling signals from the tap input terminal.

Figure 6:
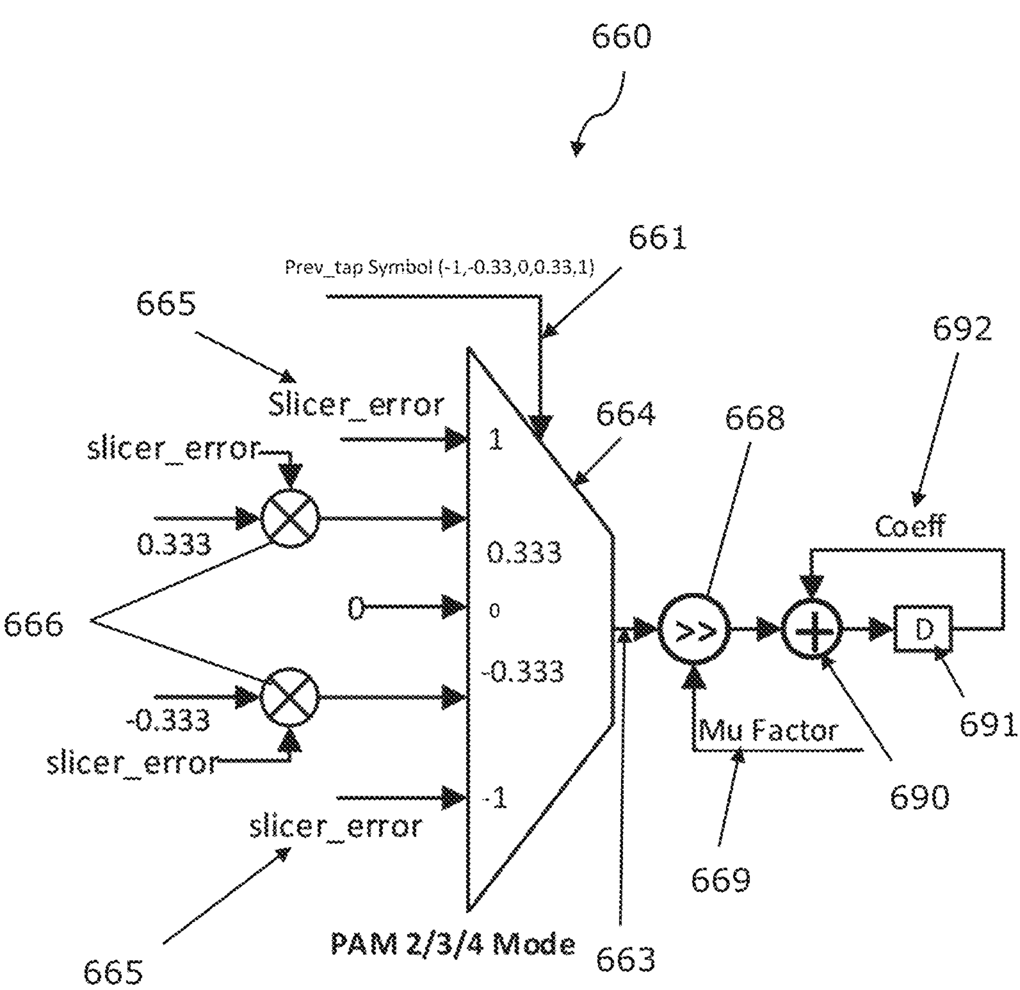
FIG. 6 shows an example implementation of a coefficient adaption unit, which is a functional part of the coefficient adaption block of FIG. 3, using the previously defined example thresholds.

FIG. 6 shows an example implementation of a coefficient adaption unit, which is a functional part of the coefficient adaption block of FIG. 3, using the previously defined example thresholds. The shown coefficient adaption unit is suitable for use with PAM-2, PAM-3 and PAM-4.

Similarly to the tap weighting blocks described in relation to FIG. 5, the coefficient adaption unit 660 follows a similar format, in that it includes a multiplexer 664 with a plurality of multiplexer input terminals 665, a select terminal 661 and a multiplexer output terminal 663.

Each multiplexer input terminal 665 receives a scaled slicer error signal which is a version of the slicer error signal (received from a slicer error input terminal connected to the slicer error block) which has been scaled by a different scaling factor. The scaling factors correspond to the target values for an appropriate PAM modulation level. For this PAM-2/3/4 coefficient adaption unit, the scaling factors are −1, −⅓, 0, ⅓ and 1. In this way, the PAM-2/3/4 coefficient adaption unit is able to utilise any scaling factor which is required by any of PAM-2, PAM-3 or PAM-4.

The select terminal 661 uses the value of a previous tap symbol to set which of the scaled slicer error signals is provided as an output signal at the multiplexer output terminal 663. As is clear from the structure of the adaptive filtering circuit, a slicer error signal represents a particular interference symbol after a period of time since said interference symbol was received by the adaptive filtering circuit. That is, it takes a finite period of time for a received interference symbol to be processed before the corresponding slicer error signal is produced. Therefore, in order for the coefficient adaption unit 660 to process: i) an interference symbol; and ii) a slicer error signal that corresponds to the same interference symbol, a delay block (not shown) is used to apply a delay to the received stream of interference symbols (received from an interference symbol input terminal, not shown) to provide a stream of previous tap symbols. The stream of previous tap symbols is aligned with the received slicer error signal that is received by the coefficient adaption unit, such that they represent or are derived from the same symbols in the received stream of interference symbols.

Similarly to the PAM-4 and PAM-2/3/4 tap weighting blocks described in relation to FIG. 5, the PAM-2/3/4 coefficient adaption unit may use scaling circuitry such as: multiplier circuits 666 that multiply the received slicer error signal (slicer_error) by ⅓ 667 in order to produce the scaled slicer error signal multiplexer input signals. The coefficient adaption unit may instead use any other types of scaling circuitry to produce the scaled coefficient signal multiplexer input signals, such as adder circuits.

The coefficient adaption unit 660 may include a slicer error sampling block (not shown) between the multiplexer input terminals 665 and a slicer error input terminal (not shown) to provide slicer error signals to the scaling circuitry. The slicer error sampling block may provide the slicer error signals to the scaling circuitry by sampling signals from the slicer error input terminal.

Similarly, the coefficient adaption unit 660 may also include a previous tap sampling block (not shown) between the select terminal 661 and a previous tap input terminal (not shown) to provide previous tap symbols to the select terminal 661. The sampling block may provide the previous tap symbols to the select terminal by sampling signals from the previous tap input terminal.

The multiplexer output terminal 663 is connected to one or more right shift operator 668 that halves the output signal that is provided by the multiplexer a number of times defined by a mu factor 669 to produce a coefficient signal. The output of the right shift operator 668 is connected to an adder 690 which is configured to cumulatively add the coefficient signal to itself at regular intervals, as defined by an output delay block 691.

The coefficient adaption unit also includes a coefficient output terminal 692 between the output delay block 691 and the adder 690 for providing the coefficient signal. This structure is a well-known implementation of a least mean squares filter adaption, and therefore we will not describe it in any more detail here.

In this way, the coefficient adaption unit is configured to use the received previous interference symbols to select one of the scaled slicer error signals to use to iteratively update the coefficient signal. The coefficient adaption block that is shown in FIG. 3 can contain one or more coefficient adaption units. For example, there can be one coefficient adaption unit per tap of the adaptive filtering circuit, or one coefficient adaption unit for multiple taps of the adaptive filtering circuit.

When a network is switched on after being inactive, some form of calibration operation is typically required. In the example of ethernet, this calibration takes the form of a link training procedure, during which the transceivers within the network can tune their equalisation settings to improve the accuracy with which symbols can be correctly identified on the network. During this calibration operation, the coefficient adaption unit updates the coefficient signal to account for the network conditions. In particular, to account for interference that is dictated by the transfer function of the bus and the transfer function of components in the processing chain of the transceiver. These interference aspects of the network conditions are relatively static. Any variation in the network conditions is likely to be due to temperature changes or other external factors.

Since the interference network conditions (i.e., the transfer function and/or characteristics of the channel) are static or change very slowly due to changes of temperature, the rate at which the coefficient adaption unit updates the coefficient signal can be reduced post-calibration without greatly increasing the risk to link performance. If predefined conditions are met, the rate at which the coefficient adaption unit updates the coefficient signal can be reduced to zero until the predefined conditions are no longer met. By reducing the rate at which the coefficient adaption unit updates the coefficient signal, the power consumption of the coefficient adaption unit is reduced, thereby increasing the energy efficiency of the device. In addition, the power consumed by the tap weighting blocks can also be reduced because the scaled coefficient signals need only be scaled when the coefficient signal is updated. Therefore, the frequency at which any scaling circuitry (for example the multiplier circuits described in relation to FIG. 5) is active can be reduced to correspond with the rate of the coefficient adaption unit. The rate at which the tap output value is set can remain at the original rate so that the interference can be effectively accounted for.

The coefficient adaption unit and coefficient scaling circuitry of the tap weighting blocks can be operated at a different rate to the slicer and the adaptive filtering circuit (and other components which need to operate at the baud rate, i.e., the frequency that symbols are transmitted or received on the network) by using a transceiver clock signal that defines a network frequency (at the baud rate) and a coefficient clock signal that defines a coefficient frequency. In some examples, the network frequency is 750 MHz. That is, the coefficient adaption block adaption block and the scaling circuitry of the tap weighting blocks can operate at the coefficient frequency, and the slicer and the adaptive filtering circuit can operate at the network frequency.

As will be discussed in detail below, the coefficient frequency can be set to different frequencies based on the state of the network. For example, during a calibration operation, the coefficient frequency can be equal to or less than the network frequency, for example 1 or ⅓ times the network frequency. After the calibration operation, the coefficient frequency can be less than it was during the calibration operation, for example $\frac{1}{10}$ or $\frac{1}{20}$ times the network frequency. It is beneficial to set the coefficient clock signal by dividing the transceiver clock signal by an integer scaling factor so that coefficient clock signal and the transceiver clock signal are synchronised. The coefficient clock signal can be derived by dividing the transceiver clock signal (baud rate clock) using a counter, such that it will be synchronous with the transceiver clock signal.

FIG. 7 shows a clock provision circuit 770 according to an embodiment of this disclosure. The clock provision circuit provides either a first clock signal or a second clock signal as a coefficient clock signal 771, based on a received rate-selection signal (shown in FIG. 7 as a linkup signal) 772. The first clock signal defines a first frequency and the second clock signal defines a second frequency that is lower than the first frequency. The rate-selection signal 772 may represent whether or not the network is undergoing a configuration/training process. The first frequency may be equal to or less than the network frequency. The clock provision circuit is connected to the clock generation circuitry displayed in FIG. 2 and provides a coefficient clock signal 771 which is divided from the transceiver clock signal (shown in FIG. 7 as a baud rate symbol clock) 773, received by a transceiver clock input terminal connected to the clock generation circuitry of FIG. 2, by either a first scaling factor (shown in FIG. 7 as a pre link up clock divide value for use during a link training phase) 774 or a second scaling factor (shown in FIG. 7 as a post link up clock divide value for use during a link up phase, after a network link has been established) 775.

The clock provision circuit 770 has an input terminal for receiving a first scaling factor 774 and an input terminal for receiving a second scaling factor 775. The first scaling factor 774 and the second scaling factor 775 may be defined by a user of the network, the manufacturer or they may be defined by a processor within the network. The first scaling factor 774 and the second scaling factor 775 may be constant or variable. One of the first scaling factor 774 and the second scaling factor 775 is selectively provided as a modulus value to a variable modulus counter 776 based on the rate-selection signal 772. The rate-selection signal 772 may be connected as a select input to a selecting circuit, configured to select between signals from the first scaling factor 774 input terminal and the second scaling factor 775 input terminal. The variable modulus counter 776 counts up to the modulus value at the rate determined by the transceiver clock signal 773. When the variable modulus counter 776 reaches the modulus value, an overflow signal is output to a clock gating block 779 as a clock gate enable signal for the duration of one clock period of the transceiver clock signal 773 in this example. The clock gating block 779 has a transceiver clock input terminal and a coefficient clock output terminal. The clock gating block 779 uses the clock enable signal to ungate the transceiver clock signal 773 to provide the coefficient clock signal 771. For example, an AND gate **779*a* can be used with input terminals configured to receive a latched version of the transceiver clock signal 773 and the clock gate enable signal, and an output terminal to provide the coefficient clock signal 771**.

In this way, the clock provision circuit 770 provides the coefficient signal by either: i) scaling the transceiver clock signal by applying a first scaling factor to the transceiver clock signal to provide a first clock signal as the coefficient signal; or ii) scaling the transceiver clock signal by applying a second scaling factor to provide a second clock signal as the coefficient signal. It will be appreciated that the specific details of the clock provision circuit 770 of FIG. 7 are just one way in which the functionality of the clock provision circuit 770 can be implemented.

In this embodiment, the clock provision circuit 770 also includes an enable signal circuit 780 to provide an enable signal 781 that can have an enabled value or a disabled value. The variable modulus counter 776 also includes an enable input terminal to receive the enable signal 781. When the enable signal 781 has an enabled value, the variable modulus counter 776 counts up to the modulus value at the rate determined by the transceiver clock signal 773. When the enable signal 781 has a disabled value, the variable modulus counter 776 stops counting/does nothing.

In this way, the clock provision circuit may provide the coefficient clock signal 771 when the enable signal 781 has the enabled value, and not provide the coefficient clock signal when the enable signal 781 has the disabled value. Beneficially, in this way, even more energy can be saved because the coefficient signal is not updated when it is not necessary to do so.

As we will now describe, the enable signal circuit 780 may provide the enable signal 781 based on one or more factors.

The enable signal circuit 780 may provide the enable signal 781 based on the magnitude of the slicer error signal (i.e., the signal that is provided by the slicer error block 328 of FIG. 3). That is, the enable signal circuit may provide the enable signal 781 in the enabled state if the slicer error signal is above a threshold value, and the enable signal circuit 780 may provide the enable signal 781 in the disabled state if the slicer error signal is below a threshold value. The threshold value may be defined by a user of the network, the manufacturer or by a processor within the network. A slicer error threshold crossing detector 782 may be used to detect if and when the slicer error signal crosses the threshold. Beneficially, in this way, the coefficient signal need not be updated if the slicer is providing accurate received symbols (that is, the slicer error is low), therefore the coefficient signal may be updated more slowly without greatly increasing the risk of inaccuracy. Updating the coefficient signal more slowly reduces the energy consumption of various components within the transceiver so the overall energy efficiency of the transceiver can be further improved.

The enable signal circuit 780 may additionally or alternatively provide the enable signal 781 based on a timing signal from a timer with configurable on/off times. A configurable timer based on/off counter 783 may be used to provide the enable signal 781 such that the enable signal alternates periodically between the enabled state and the disabled state. The frequency of the timer may be constant or variable. The frequency of the configurable timer may be predefined by the manufacturer or it may be set by the user of the network or by a processor in the network. Beneficially, in this way, the coefficient signal may be updated more slowly, depending on the requirements of the user/network. As will be appreciated from the previous discussion, this is another way of reducing the energy consumption of the transceiver.

In some examples, the enable signal circuit 780 provides the enable signal 781 based on either the magnitude of slicer error signal or on a timing signal from a timer with configurable on/off times based on an operational control signal (shown in FIG. 7 as a mode control signal) 784. In these examples, a slicer error threshold crossing detector 782 and a configurable timer based on/off counter 783 may be implemented in the same way as previously described. The value of the operational control signal 784 may be selected by a user of the network, the manufacturer or a processor within the network. The value of the operational control signal 784 may be defined based on the conditions of the network or the user's/manufacturer's preference. Beneficially, in this way, more flexibility is provided in relation to how the frequency of the coefficient clock signal 771 is set. The operational control signal 784 may be used to control a selection circuit 785 (in this example a multiplexer) with input terminals connected to a configurable timer based on/off counter 783 and a slicer error threshold crossing detector 782.

Additionally, the enable signal circuit 780 may provide the enable signal 781 based on a detected error signal (shown in FIG. 7 as a packet/parity/CRC error signal) 786 representative of the level of detected errors within the network. It will be appreciated that the use of an enable signal 781 is not essential, and that if one is used then it can be determined in any of a number of different ways. In the example of FIG. 7, the detected error signal 786 can be used to represent error data representing packet error, parity check error or a CRC (cyclical redundancy check). The detected error signal 786 may also or alternatively represent any other type of error detection mechanisms. The enable signal circuit 780 may provide the enable signal 781 in the enabled state if the detected error signal 786 represents a relatively large number of detected errors in the network signalling (that is, if the number of detected errors in the network is above a predefined threshold). The enable signal circuit 780 may provide the enable signal 781 in the disabled state if the detected error signal 786 represents a relatively small number of detected errors in the network signalling (that is, if the number of detected errors in the network is below a predefined threshold). Beneficially, in this way, the coefficient signal is only updated when the level of detected errors within the network is too high, and therefore unnecessary coefficient signal updating (and therefore energy usage) can be avoided in order to improve the energy efficiency of the transceiver.

Further still, in FIG. 7 the enable signal circuit 780 provides the enable signal 781 based on the rate-selection signal 772. Beneficially, in this way, when the rate-selection signal 772 causes the coefficient clock signal 771 to have the higher frequency (e.g., during linkup in ethernet), the enable signal can always be set such that it has the enabled value. That is, it is not possible to disable the variable modulus counter 776 when the coefficient clock signal 771 has a higher frequency (e.g., during link training) and the coefficient signal is being updated relatively quickly. Conversely, when the rate-selection signal 772 causes the coefficient clock signal 771 to have the lower frequency (e.g., after linkup in ethernet), the enable signal can set as either the enabled value or the disabled value. That is, it is possible to disable the variable modulus counter 776 when the coefficient clock signal 771 has the lower frequency.

In this embodiment, the enable signal circuit 780 provides the enable signal by any of: the detected error signal 786, the rate-selection signal 772, or either the magnitude of the slicer error signal or the timing signal from the timer with configurable on/off times based on the operational-control-signal 784. In this example, the enable signal circuit 780 includes an OR gate 786 with respective input terminals that receive: the rate-selection signal 772 (indirectly in this example via an AND gate and a NOT gate), the detected error signal 786 and a selection circuit 785 configured to select between inputs from a configurable timer based on/off counter 783 and a slicer error threshold crossing detector 782, based on an operational control signal 784. The output of the OR gate 786 provides the enable signal 781 to the variable modulus counter 776. In this way, all of the advantages described in relation to the individual use of these signals can be retained, therefore reducing the energy consumption of the system and improving energy efficiency without significantly reducing the accuracy of the determined interference error signals that are provided by the echo canceller 323 and the DFE 324 that are shown in FIG. 3.

Figure 8:
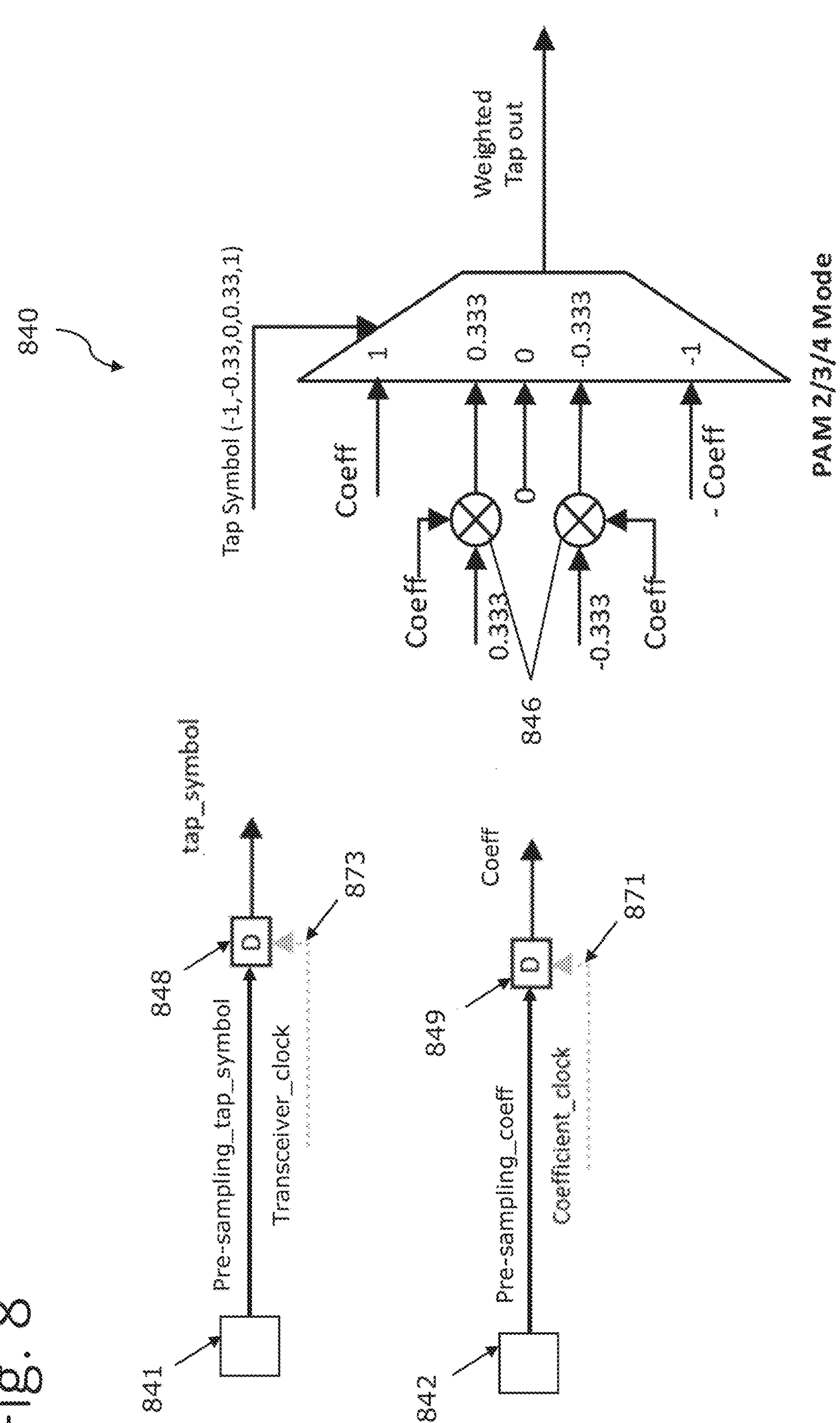
FIG. 8 shows a tap weighting block according to an embodiment of the present disclosure.

FIG. 8 shows a tap weighting block 840 according to an embodiment of the present disclosure. The tap weighting block 840 is the same in structure as the tap weighting block described in relation to FIG. 5, including a tap sampler block 848 connected to the tap input terminal 841 and a coefficient sampler block 849 connected to the coefficient input terminal 842. The tap sampler block 848 receives the transceiver clock signal 873. The tap sampler block 848 provides interference symbols (shown in FIG. 8 as tap symbols) to the tap weighting block 840 at the network frequency by sampling pre-sampling tap symbols from the tap input terminal 841. The coefficient sampler block 849 receives the coefficient clock signal 871. The coefficient sampler block 849 provides coefficient signals to the tap weighting block 840 at the coefficient frequency by sampling pre-sampling coefficient signals from the coefficient input terminal 842. Beneficially, in this way, the coefficient signals are only scaled (in this example by the multiplier circuits 846) when the coefficient signal is updated. Scaling the coefficient signals (for example by multiplication) uses energy which can be saved when the coefficient frequency is less than the network frequency. Since the interference symbols are provided to the tap weighting block at the network frequency, the tap output signals are also provided at the network frequency. Therefore, the energy of the tap weighting block can be reduced without meaningfully reducing its ability to operate because (once the link up has been completed) the coefficient signal is not expected to change significantly, or at least not to change significantly in a short period of time.

Figure 9:
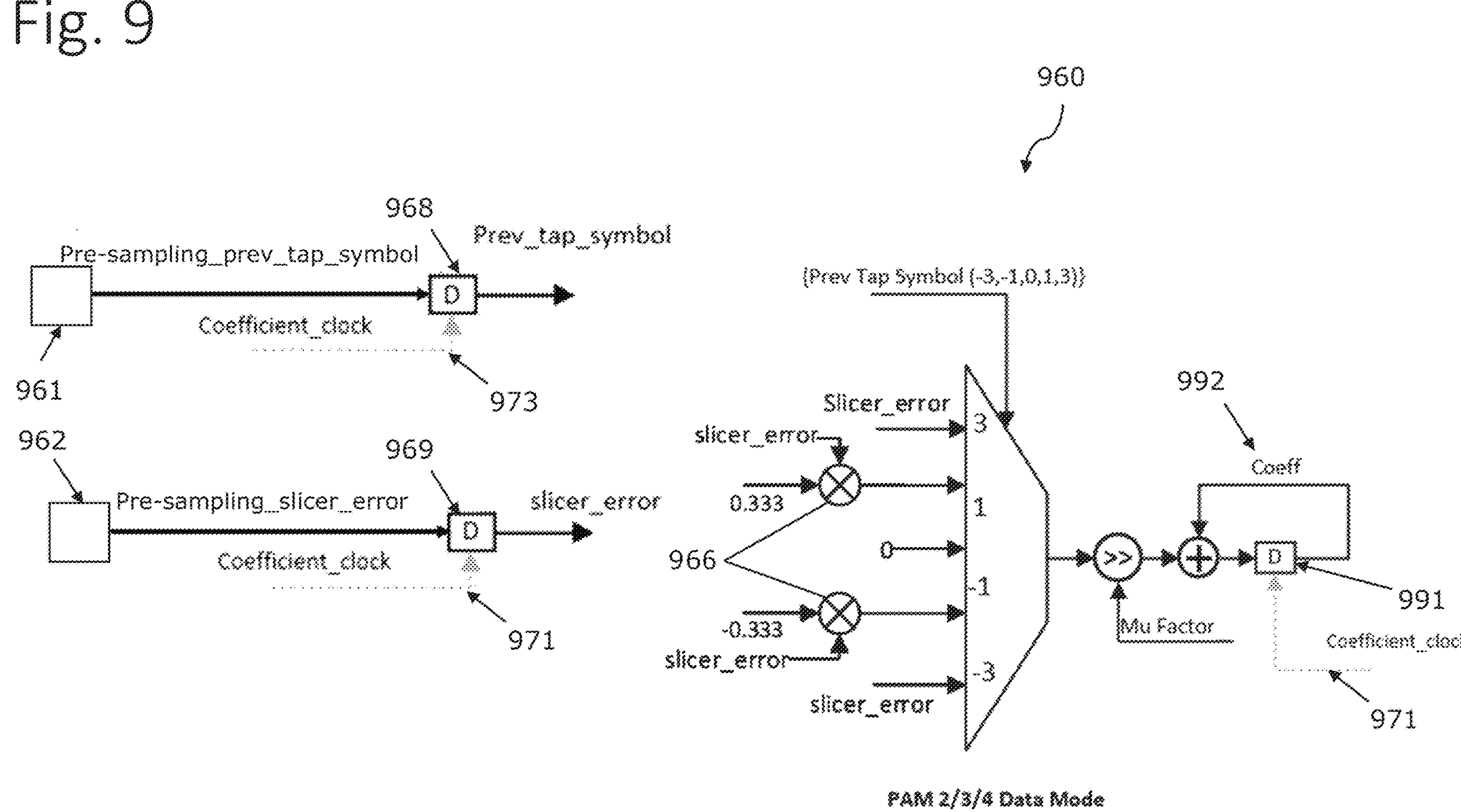
FIG. 9 shows a coefficient adaption unit according to an embodiment of the present disclosure.

FIG. 9 shows a coefficient adaption unit 960 according to an embodiment of the present disclosure. The coefficient adaption unit 960 is the same in structure as the coefficient adaption unit described in relation to FIG. 6 including a previous tap sampler block 968 connected to a previous tap input terminal 961, a slicer error sampler block 969 connected to a slicer error input terminal 962, wherein the output delay block 991 receives the coefficient clock signal 971. The previous tap sampler block 968 receives the coefficient clock signal 971. The previous tap sampler block 968 provides previous interference symbols (shown in FIG. 9 as prev tap symbols) to the coefficient adaption unit 960 at the coefficient frequency by sampling pre-sampling previous interference symbols (shown in FIG. 9 as pre-sampling prev tap symbols) from the previous tap input terminal 961. The slicer error sampler block 969 receives the coefficient clock signal 971. The slicer error sampler block 969 provides slicer error signals to the coefficient adaption unit 960 at the coefficient frequency by sampling pre-sampling slicer error signals from the slicer error input terminal 962. In this way, the coefficient adaption unit is configured to iteratively update the coefficient signal based on the slicer error signal and the aligned stream of the previous interference symbols at the coefficient frequency. Beneficially therefore, the energy used by the coefficient adaption unit can be reduced when the coefficient frequency is less than the network frequency.

Figure 10:
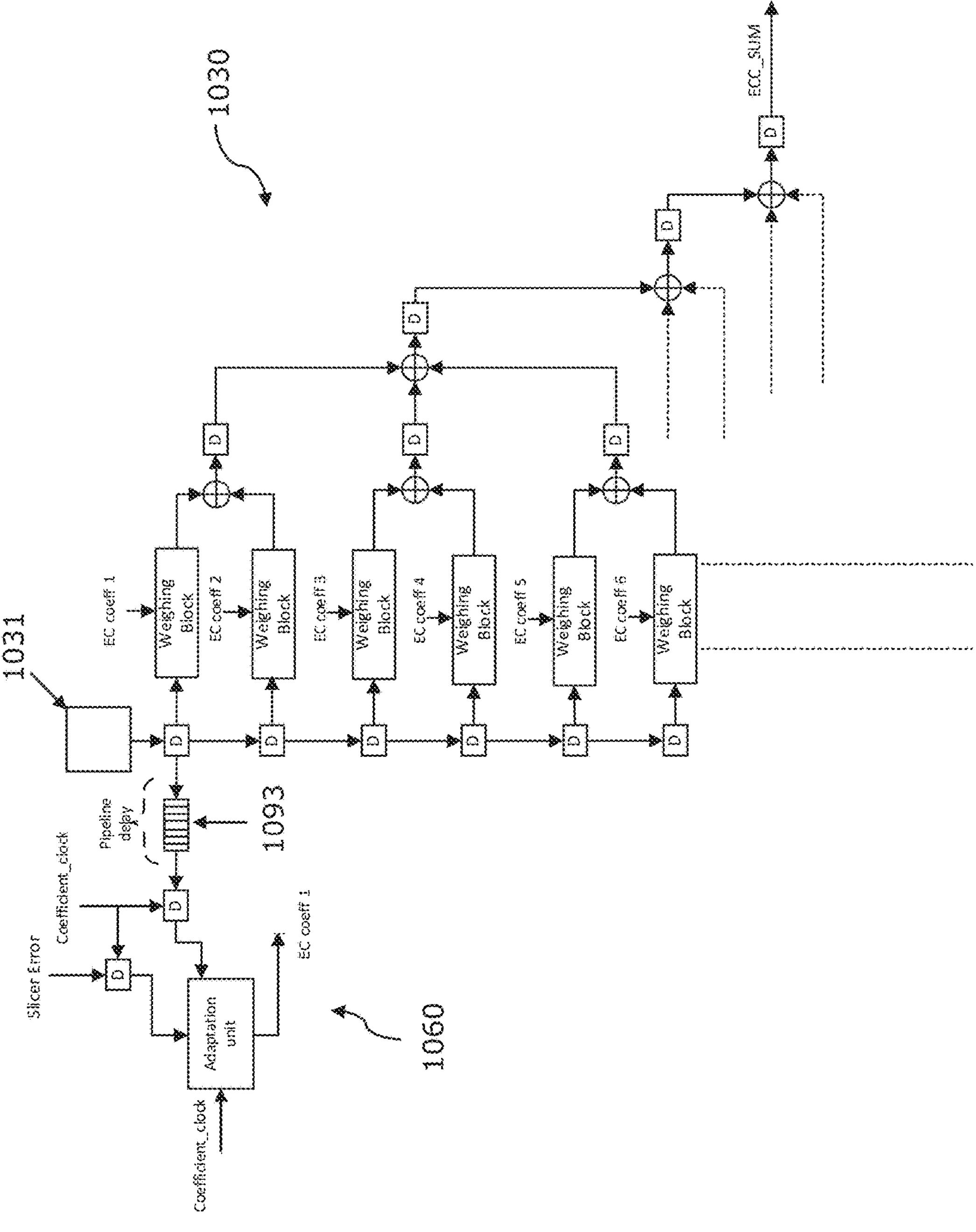
FIG. 10 shows a structure for an adaptive filtering circuit and how it connects to a coefficient adaption unit, according to an embodiment of this disclosure.

FIG. 10 shows a structure for an adaptive filtering circuit 1030 and how it connects to a coefficient adaption unit 1060, according to an embodiment of this disclosure. The structure of the adaptive filtering circuit 1030 is similar to the structure of the adaptive filtering circuit 430 described in relation to FIG. 4, and the coefficient adaption unit 1060 includes at least one of the coefficient adaption units described in relation to FIG. 9. The filter input terminal 1031 sequentially receives interference symbols at the network frequency. The coefficient adaption block 1060 updates the one or more coefficient values at the coefficient frequency. The coefficient adaption block 1060 includes a delay block (referred to as a pipeline delay in FIG. 10) 1093 to apply a delay to the stream of interference symbols to provide a stream of previous interference symbols, such that the previous interference symbols are aligned with the slicer error signal that they represent or are derived from. The slicer error signals and the previous interference symbols are then provided to the coefficient adaption unit at the coefficient frequency, as described in relation to FIG. 9.

Figure 11:
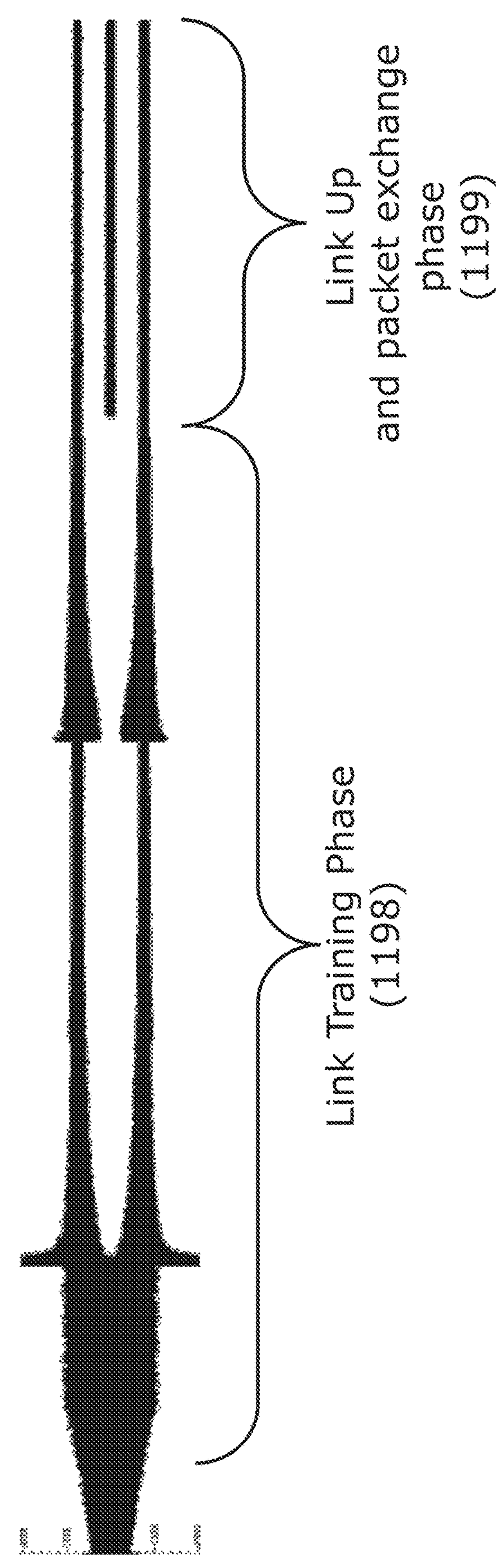
FIG. 11 shows a signal simulation representing operation of an ethernet network.

FIG. 11 shows a signal simulation representing operation of an ethernet network which performs a configuration/training process 1198 using PAM-2 and then performs normal network signalling using PAM-3 1199, according to an embodiment of this disclosure. FIG. 11 shows that the variance of the signals after the configuration/training process 1198 reduces to a relatively small and relatively constant value. This means that the interference within the network has less of an effect after the configuration/training process 1198 has concluded, and therefore the coefficient signals are unlikely to need to be frequently updated in order to account for the interference.

Figure 12:
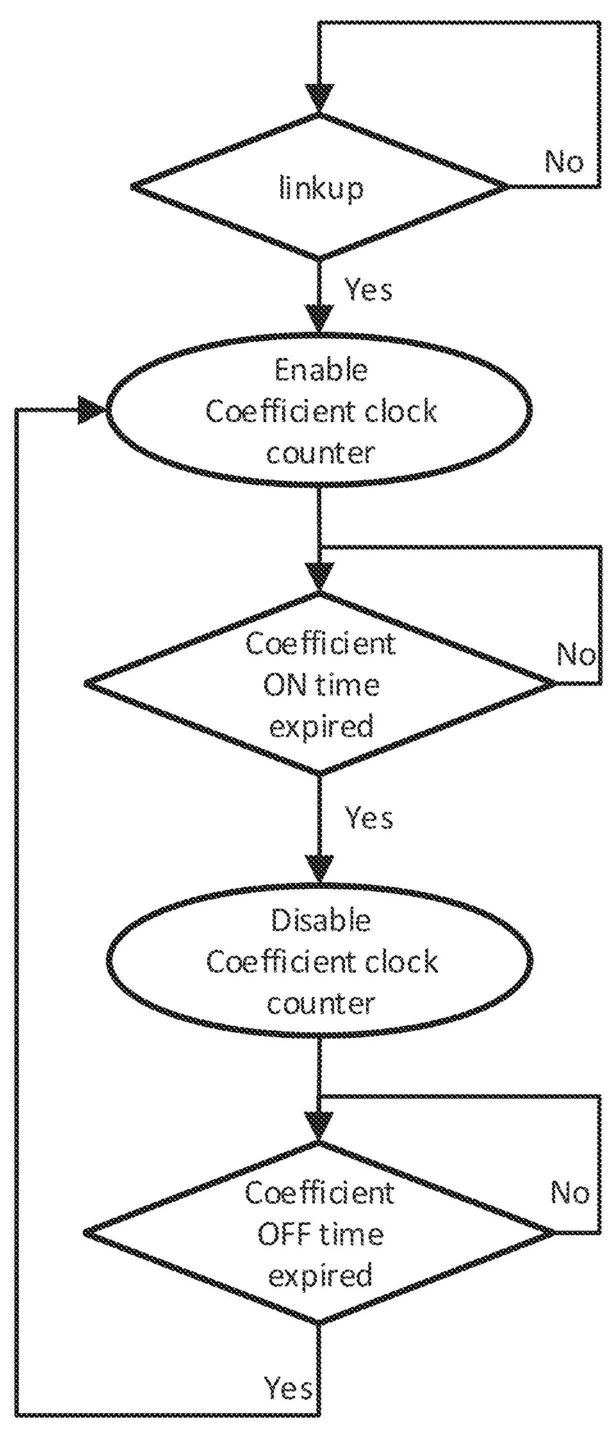
FIG. 12 shows a flowchart that illustrates a method of implementing coefficient clock control using the timer based counter described in relation to FIG. 7.

FIG. 12 shows a flowchart that illustrates a method of implementing coefficient clock control using the timer based counter described in relation to FIG. 7. First, the transceiver checks whether linkup has been achieved (i.e., whether the configuration/training process has ended). When linkup is achieved, the coefficient clock counter is enabled for a time period defined by a timer. When the coefficient ON time has expired, the coefficient clock counter is disabled. When the coefficient OFF time has expired, the coefficient clock counter is enabled again for a time period defined by the timer. This process can loop indefinitely, or it can be cancelled by using an operational control signal to change the basis for providing the coefficient clock counter signal, as described in relation to FIG. 7. The coefficient ON time and the coefficient OFF time may be defined by a user of the network, the manufacturer or a processor within the network.

Figure 13:
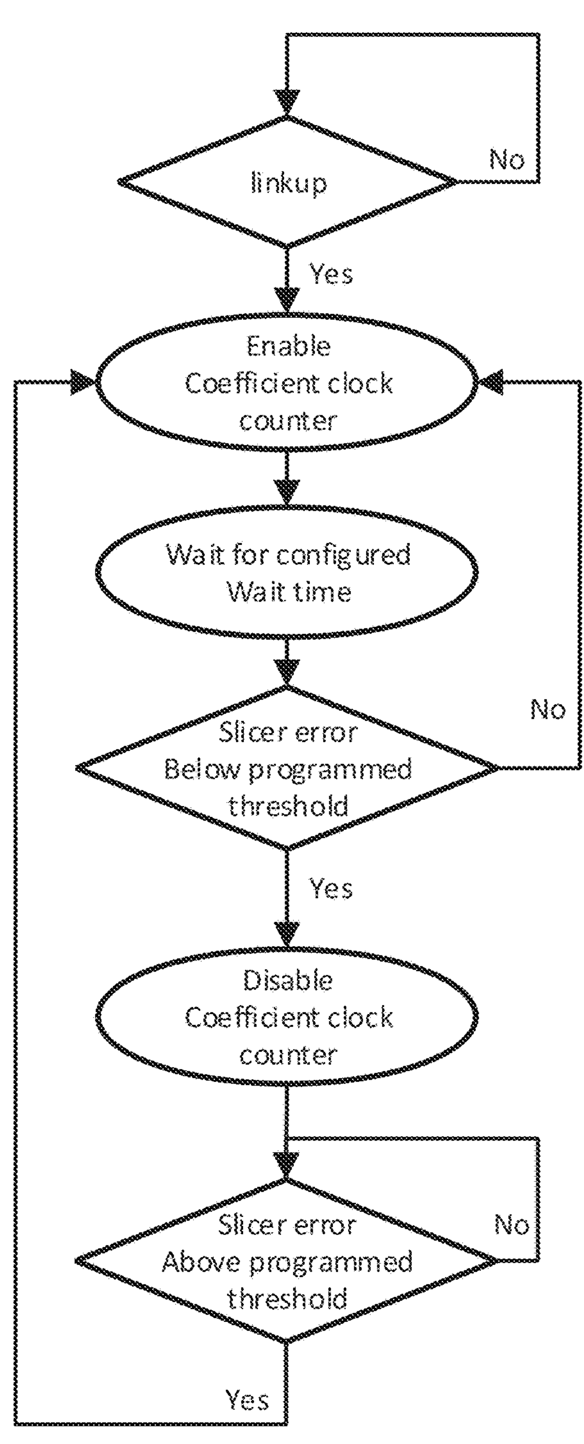
FIG. 13 shows a flowchart that illustrates a method of implementing coefficient clock control using the slicer error threshold crossing detector described in relation to FIG. 7.

FIG. 13 shows a flowchart that illustrates a method of implementing coefficient clock control using the slicer error threshold crossing detector described in relation to FIG. 7. First, the transceiver checks whether linkup has been achieved (i.e., whether the configuration/training process has ended). When linkup is achieved, the coefficient clock counter is enabled and the slicer error threshold crossing detector waits for a configured wait time. After the configured wait time has elapsed, the slicer error threshold crossing detector checks if the magnitude of the slicer error signal is below a programmed threshold. If the slicer error is not below the programmed threshold, then the coefficient clock counter is (or remains) enabled and the slicer error threshold crossing detector waits for the configured wait time. This process loops until the magnitude of the slicer error signal is detected to below the programmed threshold. If the magnitude of the slicer error is found to be below the programmed threshold, the coefficient clock counter is disabled. The slicer error threshold crossing detector then continually checks if the magnitude of the slicer error signal is above the programmed threshold. If the magnitude of the slicer error signal is found to be above the programmed threshold, then the coefficient clock counter is enabled and the slicer error threshold crossing detector waits for the configured wait time. This process can loop indefinitely, or it can be cancelled by using an operational control signal to change the basis for providing the coefficient clock counter signal, as described in relation to FIG. 7. The wait time and the programmed threshold may be defined by a user of the network, the manufacturer or a processor within the network.

Figure 14:
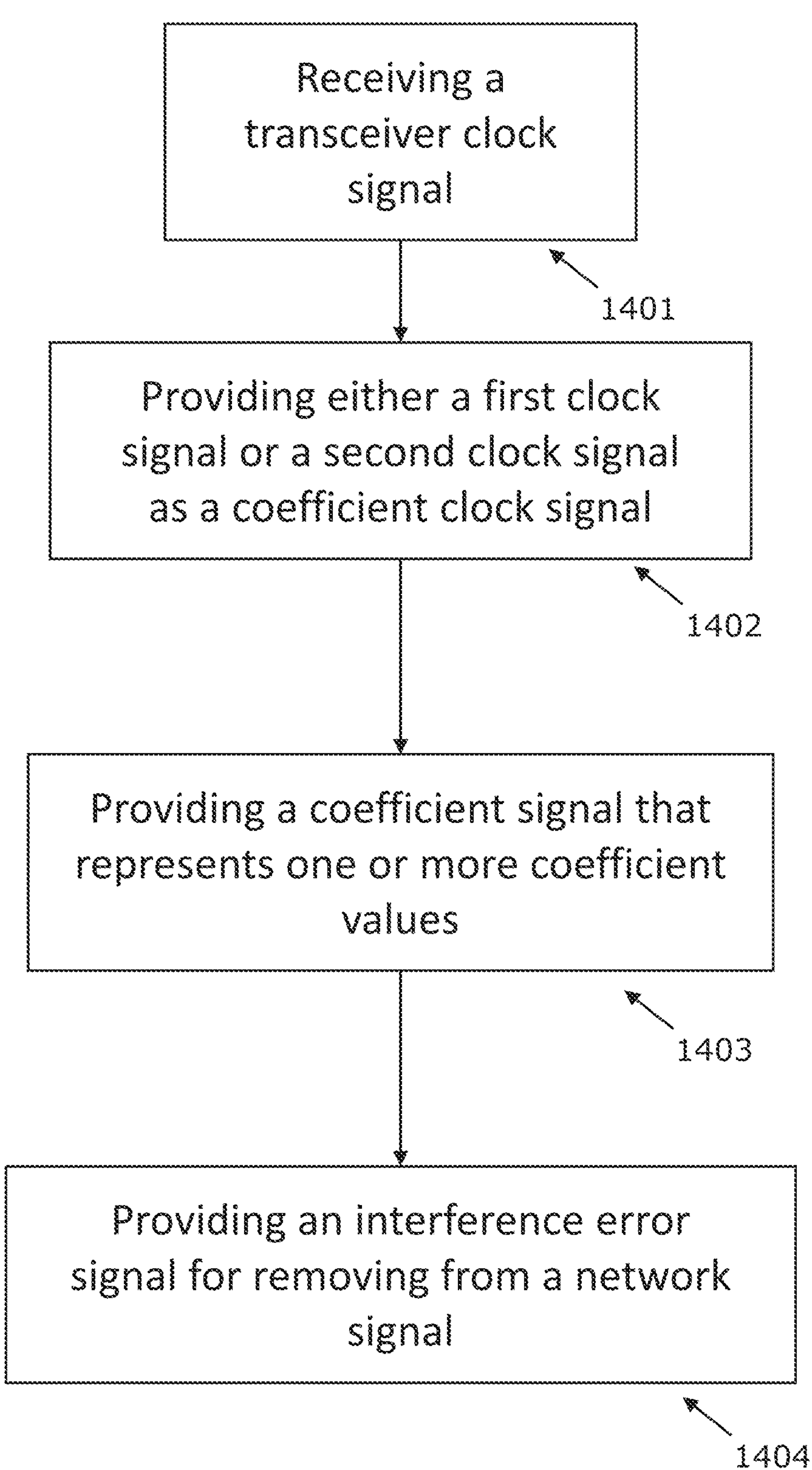
FIG. 14 shows a flowchart to describe a method for transmitting and receiving signals within a network.

FIG. 14 shows a flowchart to describe a method for transmitting and receiving signals within a network. Firstly, the method involves receiving a transceiver clock signal that defines a network frequency 1401. Next, the method involves providing either: i) a first clock signal or ii) a second clock signal as a coefficient clock signal 1402. This provision is based on a received rate-selection-signal. The first clock signal defines a first frequency, and the second clock signal defines a second frequency that is lower than the first frequency. Next, the method involves providing a coefficient signal that represents one or more coefficient values 1403. Providing the coefficient signal comprises updating the one or more coefficient values at the coefficient frequency. Lastly, the method involves providing an interference-error signal for removing from a network signal 1404. Providing the interference-error signal comprises: applying a plurality of scaling factors to the coefficient signal to create a plurality of scaled coefficient signals, and using the received interference-symbol to select one of the scaled coefficient signals to use to provide the interference-error signal.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver circuit for transmitting and receiving signals within a network, wherein the transceiver circuit comprises:

a transceiver clock input terminal configured to receive a transceiver clock signal that defines a network frequency;

a clock provision circuit configured to provide, as a coefficient clock signal defining a coefficient frequency, a selected one of: i) a first clock signal defining a first frequency or ii) a second clock signal defining a second frequency that is lower than the first frequency, based on a received rate-selection-signal;

a coefficient adaption unit for providing a coefficient signal that represents one or more coefficient values, wherein the coefficient adaption unit is configured to update the one or more coefficient values at the coefficient frequency; and an adaptive filtering circuit, comprising:

at least one coefficient input terminal connected to the coefficient adaption unit for receiving the coefficient signals, a filter input terminal for sequentially receiving a stream of interference-symbols at the network frequency, and a filter output terminal for providing an interference-error signal, wherein the interference-error signal is to be removed from a network signal, wherein the adaptive filtering circuit is configured to:

apply a plurality of scaling factors to the coefficient signal to create a plurality of scaled coefficient signals, and selecting, based on the received interference-symbols, one of the scaled coefficient signals to use to provide the interference-error signal.

2. The transceiver circuit of claim 1 wherein the signals within the network are pulse amplitude modulation, PAM, signals.

3. The transceiver circuit of claim 2 wherein the PAM signals can take a value according to any of two-level modulation, three-level modulation or four-level modulation.

4. The transceiver circuit of claim 2, further comprising:

a slicer configured to compare a processed-network-signal to a plurality of slicer thresholds and provide a received symbol such that the received symbol has one of a plurality of target values associated with a PAM modulation level of the network signals.

5. The transceiver circuit of claim 4 wherein the clock provision circuit further comprises an enable signal circuit configured to provide an enable signal that can have an enabled value or a disabled value, and wherein the clock provision circuit is configured to:

provide the coefficient clock signal when the enable signal has the enabled value; and not provide the coefficient clock signal when the enable signal has the disabled value.

6. The transceiver circuit of claim 5 wherein the enable signal circuit is configured to provide the enable signal based on the magnitude of the difference between the received signal and the processed-network-signal.

7. The transceiver circuit of claim 5 wherein the enable signal circuit is configured to provide the enable signal based on a timing signal from a timer with configurable on/off times.

8. The transceiver circuit of claim 5 wherein the enable signal circuit is configured to provide the enable signal based on a selected one of a magnitude of the difference between the received signal and the processed-network-signal or a timing signal from a timer with configurable on/off times based on an operational-control-signal.

9. The transceiver circuit of claim 5 wherein the enable signal circuit is configured to provide the enable signal based on a detected error signal representative of the level of detected errors within the network.

10. The transceiver circuit of claim 5 wherein the enable signal circuit is configured to provide the enable signal based on the rate-selection signal.

11. The transceiver circuit of claim 5 wherein the enable signal circuit is configured to provide the enable signal by any of:

a detected error signal representative of the level of detected errors within the network, the rate-selection signal, or a selected one of a magnitude of the difference between the received signal and the processed-network-signal or a timing signal from a timer with configurable on/off times based on an operational-control-signal.

12. The transceiver circuit of claim 4, further comprising a slicer error signal block configured to provide a slicer error signal, wherein the slicer error signal is the difference between the processed-network-signal and the received symbol, and wherein the coefficient adaption unit comprises:

at least one slicer error input terminal for receiving the slicer error signal, at least one interference symbol input terminal for receiving the stream of interference symbols, a delay block for applying a delay to the stream of interference-symbols to provide a stream of previous interference symbols, such that the previous interference symbols are aligned with the slicer error signal that they represent, or are derived from, and a coefficient-output terminal for providing the coefficient signal;

wherein the coefficient adaption unit is configured iteratively update the coefficient signal based on the slicer error signal and the aligned stream of previous interference symbols at the coefficient frequency.

13. The transceiver circuit of claim 1, wherein the clock provision circuit is configured to:

scale the transceiver clock signal by applying a first scaling factor to the transceiver clock signal to provide the first clock signal as the coefficient signal; or scale the transceiver clock signal by applying a second scaling factor to the transceiver clock signal to provide the second clock signal as the coefficient signal, wherein the first frequency is equal to or less than the network frequency.

14. The transceiver circuit of claim 1 wherein the network is ethernet.

15. A method for transmitting and receiving signals within a network, wherein the method comprises:

receiving a transceiver clock signal that defines a network frequency;

providing a selected one of: i) a first clock signal or ii) a second clock signal as a coefficient clock signal, based on a received rate-selection-signal, wherein the first clock signal defines a first frequency, and the second clock signal defines a second frequency that is lower than the first frequency;

providing a coefficient signal that represents one or more coefficient values, wherein providing the coefficient signal comprises:

updating the one or more coefficient values at the coefficient frequency; and providing an interference-error signal to be removed from a network signal, wherein providing the interference-error signal comprises:

receiving a stream of interference-symbols at the network frequency;

applying a plurality of scaling factors to the coefficient signal to create a plurality of scaled coefficient signals, and using the received interference-symbols to select one of the scaled coefficient signals to use to provide the interference-error signal.

* * * * *